F. A. COARI.
NUTCRACKING MACHINE.
APPLICATION FILED SEPT. 14, 1918.

1,407,325. Patented Feb. 21, 1922.
8 SHEETS—SHEET 1.

FIG. 1.

Witnesses
Philip T. Borman
Sivert Moe

Inventor
Frank A. Coari.
By Daniel A. Brennan.
Attorney.

F. A. COARI.
NUTCRACKING MACHINE.
APPLICATION FILED SEPT. 14, 1918.

1,407,325.

Patented Feb. 21, 1922.
8 SHEETS—SHEET 4.

WITNESSES:
Philip T. Borman
Sivest Moe

INVENTOR.
Frank A. Coari.
BY Daniel Brennan,
ATTORNEY.

F. A. COARI.
NUTCRACKING MACHINE.
APPLICATION FILED SEPT. 14, 1918.

1,407,325.

Patented Feb. 21, 1922.
8 SHEETS—SHEET 5.

WITNESSES:
Philip K. Borman
Brennan Wahl

INVENTOR.
Frank A. Coari.
BY Daniel Brennan
ATTORNEY.

F. A. COARI.
NUTCRACKING MACHINE.
APPLICATION FILED SEPT. 14, 1918.

1,407,325.

Patented Feb. 21, 1922.
8 SHEETS—SHEET 8.

WITNESSES:

INVENTOR.
Frank A Coari.
BY Daniel J Brennan,
ATTORNEY

UNITED STATES PATENT OFFICE.

FRANK A. COARI, OF CHICAGO, ILLINOIS.

NUT-CRACKING MACHINE.

1,407,325.  Specification of Letters Patent.  Patented Feb. 21, 1922.

Application filed September 14, 1918. Serial No. 254,105.

*To all whom it may concern:*

Be it known that I, FRANK A. COARI, a citizen of the United States, residing at Chicago, county of Cook, and State of Illinois, have invented certain new and useful Improvements in Nut-Cracking Machines, of which the following is a specification.

This invention relates to nut-cracking machines and more particularly pertains to improvements on Patent No. 797,260, and the invention consists in the matters hereinafter set forth and pointed out in the appended claims.

The principal object of the invention contemplates the improved construction of machines of this character, whereby the cracking mechanism is regulated so as to lock positively and automatically, and which will be capable of automatically adjusting itself, to deliver independent cracking operations to nuts of different lengths and whereby abortive operation of the cracking mechanism is obviated, and the number of miscracked nuts reduced to a minimum.

A further object of the invention, is to provide improved means for uniformly feeding the nuts from the lower part of a laterally disposed hopper to the feeding belt, and whereby the overfeeding and jamming of the nuts is prevented.

A further object of the invention is to provide the hopper with a shaking element, having engagement with the endless feeding belt to vibrate same, so that the nuts will be deposited endwise into carrying receptacles in the feeding belt, and wherein the necessity of the constant attention of the operator is eliminated.

A further object of the invention, is to provide improvements in the construction and operation of nut-cracking machines, whereby the capacity of the machine is increased by reason of ability to operate the machine rapidly and the reduction to a minimum, of miscracked nuts.

A further object of the invention, is to provide a compact machine requiring but a small amount of floor space for its occupancy and which, by its simplicity of construction and operation, requires no extraordinary degree of mechanical ability on the part of the operator, to run and superintend it.

A still further object of the invention, is to provide means for automatically ejecting the nuts from the feeding belt into an intermittingly advancing carrier and presenting them to the co-operating parts of the cracking mechanism.

Other objects of the invention will be set forth in the following description of the machine and embodied in the claims.

In the drawings.

In describing the invention, reference will be had to the accompanying drawings, wherein corresponding and like parts are indicated in all of the views by the same reference characters.

Referring to the drawings, 1 designates the bed frame of the machine which is supported by the standards 2 and 3, being bolted together in the manner of machines of this character. The numeral 4 designates a hopper disposed on the rear side of the bed frame of the machine and into which are deposited the nuts (in a mass), and from which they are delivered severally by a suitable feeding mechanism to the cracking mechanism. The hopper 4, is supported at its upper end by brackets 5, on the bed frame 1, while the lower end is supported on brackets 6, the latter extending laterally and upwardly from and attached to standard 3, being suitably shaped at its upper end to support the lower end of the hopper.

The nuts are fed from the hopper 4, to the cracking mechanism by means of a feeding belt or carrier moving through the bottom of the inclined hopper which carries the nuts in a plurality of recesses or chambers in the belt bars from said hoppers, and means is provided for ejecting the nuts from the feeding belt into an intermittingly advancing carrier, which travels between oppositely located co-operative elements of the cracking mechanism.

The endless feeding belt designated by numeral 7, travels for the greater part of its length between the side walls and parallel with the false bottom 8, of the hopper 4, passing through an opening 9, in the lower end of its sloping sides. The said belt is formed of a plurality of transversely extending and parallelly disposed bars 10, connected at their ends to the links of the sprocket chains 11. The bars and chains constitute as a whole a continuous web-belt, having pockets or chambers 12, for the reception of the nuts to convey them from the hopper, the said pockets having the form of recesses in the bars 10. The sprocket chains 11, are trained about sprocket wheels 13, which are disposed in pairs at the upper and lower ends of the hopper, and the shafts 14, of said sprocket wheels, are mounted in suitable bearings on the brackets 5 and 6. Means are provided for the proper adjustment of the feeding belt and the lower brackets 6 are formed with elongated journal openings 15, in which the lower shaft 14 is mounted and the same is capable of adjustment to hold the chain 11 at proper operative tension.

Figure 27:
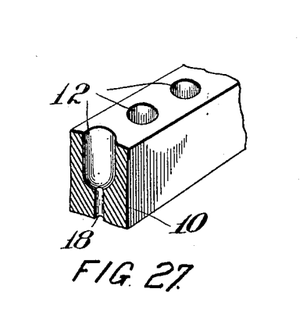
Fig. 27, is a vertical section of one of the cross bar members.

The upper shaft 14 forms the connection between the two sets of brackets 5, which support the upper end of the hopper 4. The false bottom 8, serving as a supporting medium for the nuts in mass in the hopper, is spaced from and extends in parallel alignment with the feeding belt 7, and comprises a sheet of spring metal, the extreme lower marginal portion, immediately adjacent the hopper end wall, being bent downwardly at 16. The space between the bent portion 16, of the false bottom and the lower end wall of the hopper, is of sufficient width to allow only one row of the nuts to pass through the said space and be deposited endwise into the recesses 12, in the chain belt bars 10. In this connection it may be stated that the aforesaid recesses 12, are of a dimension slightly wider than the horizontal medial diameter of the largest nut of the particular species to be operated upon, and the openings forming the said recesses 12, extend inwardly to such depth, that the nuts are nestled to approximately two-thirds of their length in the said recesses. The bars 10, are provided with restricted openings 18, (illustrated in Fig. 27) communicating with the bar recesses 12, and through which a series of ejector pins are operable and which will be later more fully described. It will be readily perceived that the bars and chains practically constitute a continuous web-belt, having a series of pockets or recesses adapted to receive a predetermined number of nuts and to deliver them to the cracking mechanism in proper position for submission to same.

Figure 26:
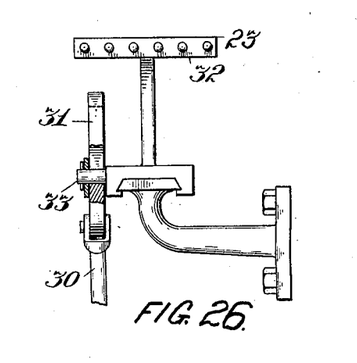
Figure 26, is a detail view of the ejector pin bar mechanism

The nuts are discharged from the endless feeding belt 7, into a carrying belt or conveyor 19, which travels transversely across the bed of the machine, between a pair of guide plates 20 secured to the bed housing 21. Said carrying belt 19, is made up of a plurality of loosely connected links, shaped to form a plurality of transverse pockets 22, which laterally receive the nuts delivered thereto, and said pockets are so disposed that when the carrier is arrested, a series of cracking plungers are in line with a number of pockets equal to the number of pairs of opposing plungers of two opposed groups. The ejecting mechanism as heretofore mentioned, comprises a plurality of ejector pins 23, and is operated through a main shaft 24, suitably journalled in bearings in the standards 2 and 3, of the bed frame. A face cam 25 fixably mounted on the continuously rotatable main shaft 24, suitably imparts motion to a double bell crank 26, mounted on a pivot block 27 on the standard 3, and the lower end of the bell crank carries an antifriction roller 28, adapted for engagement with the face cam 25. The bell crank 26, transmits motion to a slotted bell crank 29, through a connecting rod 30 and a brace bar 31, is pivotally secured at its upper end to bracket 5, and at its lower end to bell crank 29. A cross head member 32, (Fig. 26), carrying the ejector pins 23, at its upper end, has pin connection 33; with the upper slotted leg of the bell crank 29, causing the cross head member to advance with the rotation of the slotted bell crank, thus intermittently advancing the ejector pins 23, into the openings 18 of the bars 10 of the chain belt, to force the nuts contained therein into the pockets 22 of the transverse conveyor. A spring 34, secured at one end to the hopper and to the slotted bell crank at the other, returns the cross head member 32 and the ejector pins 23, to their normal position after having ejected a set of nuts.

As the nuts are fed through the opening at the lower end of the hopper to the endless feeding belt 7, vibration is imparted to the upper lap of the belt to insure the nuts lodging endwise in the pockets or chambers 12, through a mechanism provided for that purpose, described and operated as follows: A bent lever 35, carrying an antifriction roller 36 fastened to its lower end, pivots about a fulcrum pin 37 on the standard 3, and the roller 36 engages each successive tooth 38, of a star cam 39, which latter is mounted on the main shaft 24, thus imparting a downward movement to the upper end of the bent lever 35. The upper end of said lever is connected to the hopper by means of a spring 40, attached to an angle plate 41, and a flat member 42, carried by the said lever, has slapping engagement with the under side of the endless feeding belt 7, as the bent lever 35 rocks.

The two conveying and feeding mechanisms are given an intermittent advance movement and such will be fully described hereinafter.

It has thus been shown how the nuts are conveyed to the cracking elements and their ejectment and positioning, with relation to said mechanism.

The cracking mechanism comprises two groups of opposing co-acting plungers, an equal number of plungers in each set arranged one set on each side of the path of the conveyer 19.

The bed housing 21, of the machine, is preferably cast in one piece, and embodies a hollow casing having two flat lower bearing surfaces 43, adjacent its opposite ends and two elevated bearing surfaces 44, centrally disposed with relation to the said bed and which latter are spaced apart to form a central opening through which travels the conveyor 19, that carries the nuts to the cracking plungers. The guide plates 20 are bolted to the opposite walls of said housing at the top of said opening, and the walls of said housing adjacent the central opening are chambered for the reception of certain co-operating elements of the plunger rods 45, having sliding engagement therein. Each set of apertures in the guide plates 20 are disposed opposite each other, one on each side of the path of the nuts through the machine. The plunger rods 45 are assembled on the elevated surface 44, of the casing or housing and have connected therewith at one end cylindrical shanks 45', which travel through the said openings in the guide plates 20, and each plunger body is substantially rectangular. The head portions 45'' of the rods 45', have edge to edge bearings with each other and bearings on the elevated surfaces 44 of the casing. The head portions 45'' are adjustably connected and locked with the shanks 45', by means of a thread and lock nut, and the outer ends of the shank portions 45' are provided with a concave recess 46, adapted to receive the convex end of the nut to be cracked. The opposite lateral faces 47 of the head piece 45'' are vertical and parallel with each other as herein shown and the top and bottom are horizontal. The rear face 48 of the head is oblique, or inclined inwardly and upwardly from its lower to its upper side, and the rear face is provided at one side thereof, with a hook shaped flange 49, extending outwardly from said rear face and thereby forming a groove 50, between the flange 49 and the rear face of the head piece 45''. The front and rear walls of the head consisting respectively of the rear face of the head and the front face of said flange, are inclined so that the groove is inclined upwardly and inwardly from its lower end, and the rear face of the flange is also inclined parallel with the rear face of the head. The numeral 51 designates a plurality of vertical sliding wedges, one for each plunger of each set and said wedges are operable in openings in the casing between each set of upper and lower bearing surfaces 43 and 44. The wedges 51 are provided near their front face at their lateral sides, with inclined grooves 52, which are inclined to correspond with the inclination of the rear faces of the heads 45'' of the cracking plungers and are adapted to receive the hook shaped flanges 49, projecting from the rear faces of said heads. It is obvious from the construction recited, that since the smaller ends of the wedges 51, are directed downwardly, when the said wedges descend, they act to advance the cracking plungers forward over the bearing surfaces 43 and plunger rods 45, through the openings in the guide plates 20, and thus force the plungers toward each other or into their cracking positions. If at this time there be interposed between the plungers a set of nuts, the two groups of advancing plungers first act to position the nuts centrally on the carrier 19, prior to subjecting them to the cracking operation. It will be furthermore noted, by reason of the vertical movement of the wedges 51, and the interlocking connection between the wedges 51 and the heads 45'' of said plungers, consisting of the flanges on the heads and the grooves on the wedges, that when the wedges 51 are raised, they will set to retract the cracking plungers to their inoperative positions. Means are likewise provided whereby the plungers of the two groups are advanced into cracking operation simultaneously with each other, and are in a like manner withdrawn from their operative positions. This means operates through the medium of the wedges 51 and when the plungers are retracted, the wedges are therefore in their upper or advanced positions, the latter being held in that position by the element which raised them.

The wedges 51, have interlocking guiding engagement with the cross heads 53, which latter are slidably mounted in horizontal guide grooves in the lower bearing surfaces 43 of the casing, and are formed with guide flanges 54, and bars 55, have portions projecting over the flange portions 54 and are bolted as at 56, to the casing proper, serving to hold the same in retracted position.

Pressure is applied to the said cross heads in a horizontal direction and acts through the wedges and plungers to produce the final cracking pressure on the nuts described hereinafter.

The movement of the cross heads 53 in one direction is limited by the stop bars 55, having their ends attached to the casing proper by bolts 56, while movement in the opposite direction is regulated by springs 57 attached at one end to the cross heads and at the other to the elevated portion 44 of the casing. The function of the springs 57 is to return the cross heads 53 to normal position after a cracking operation.

Figure 1:
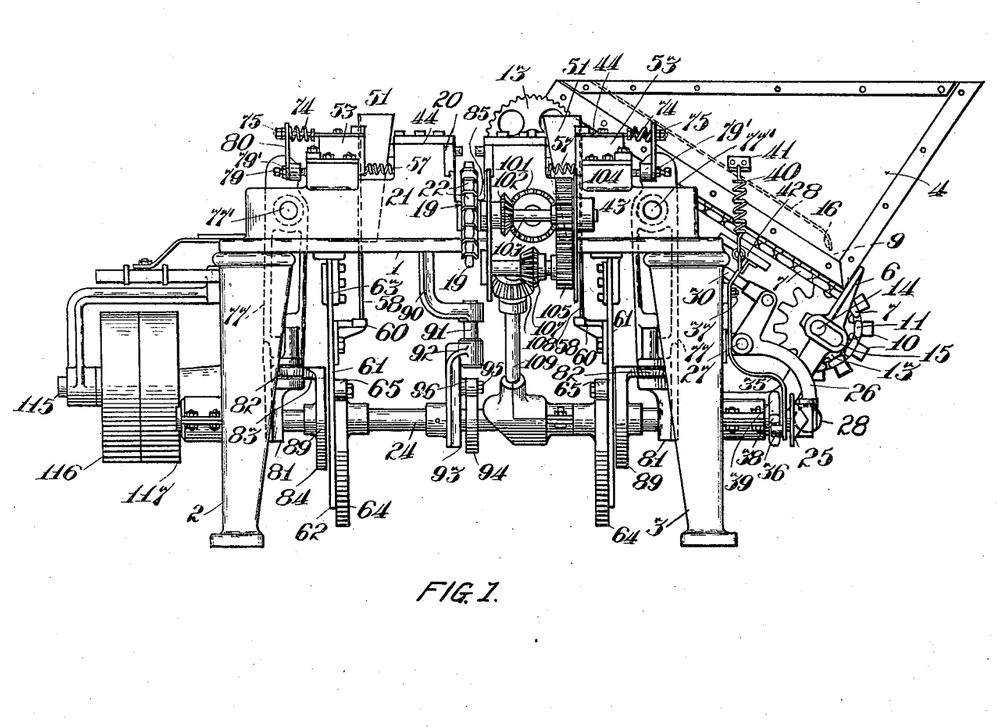
Figure 1, is a front elevational view of a nut cracking machine made in accordance with my invention.
Figure 2:
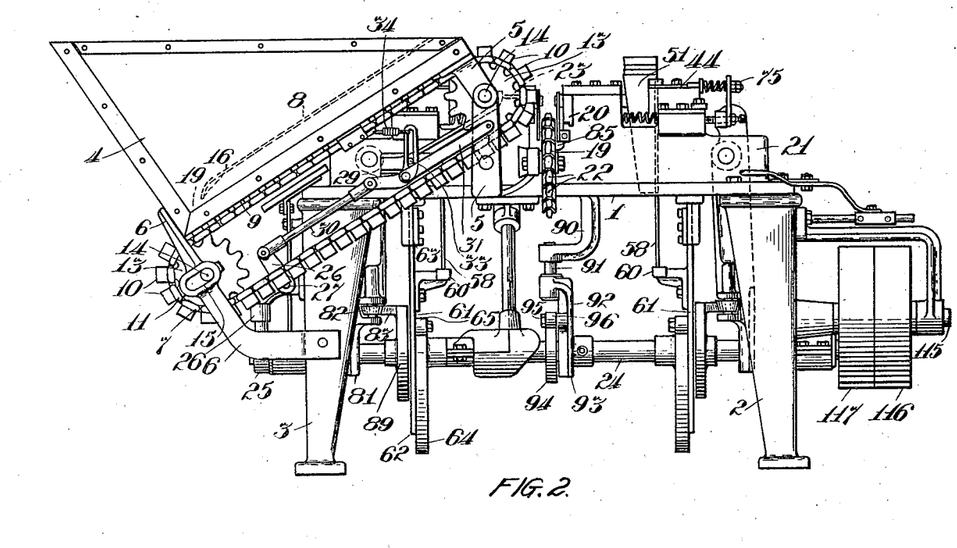
Figure 2, is a rear elevation thereof.
Figure 3:
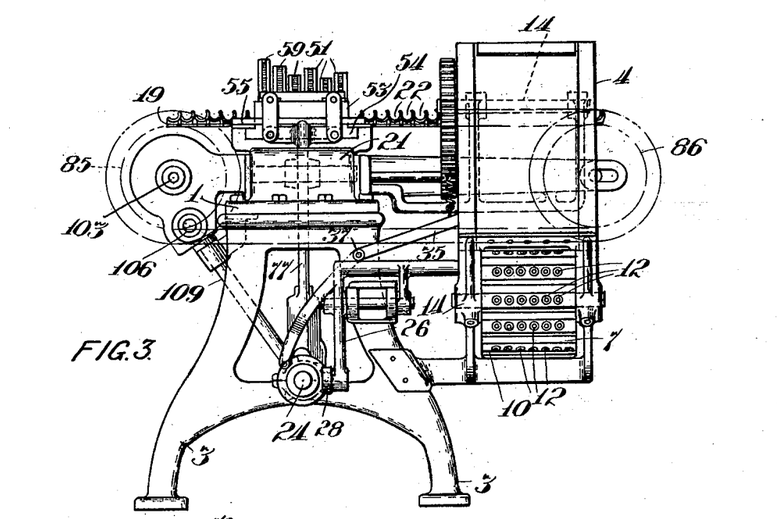
Figure 3, is an end elevation viewed from the hopper end.
Figure 4:
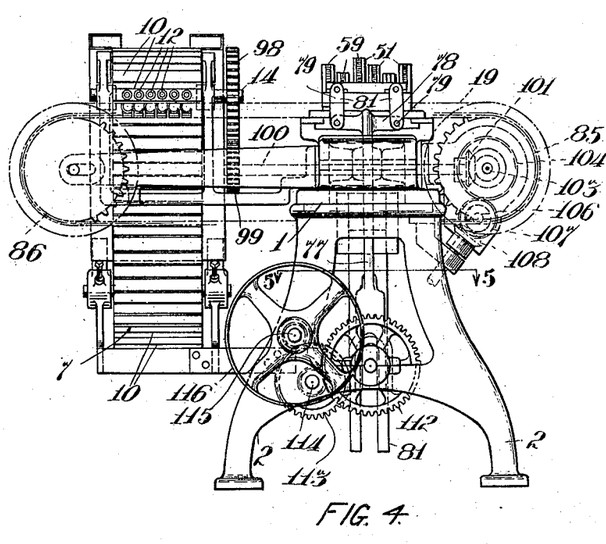
Figure 4, is an end elevation viewed from the drive end.
Figure 5:
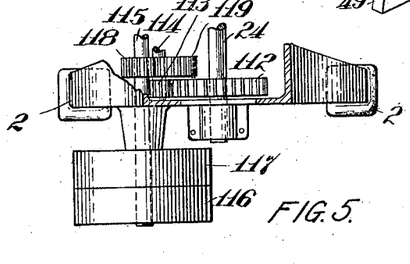
Figure 5, is a transverse section taken on line 5—5 of Fig. 4.

The wedges 51 on their perpendicular edges, are provided with tripping bars 58, the outer edges of which are knurled as at 59 and said bars 58 extend for some distance below the said wedges, being adapted for engagement with the brackets 60 carried by the yokes 61, each of said brackets 60 being located directly below a set or group of wedges 51. The wedges are intermittently raised into engagement with the plungers to withdraw same to their inactive positions as follows: The yokes 61 act to elevate each set of wedges 51, and comprises forked arms 62, having sliding engagement with a bearing 63, suitably mounted in the machine bed frame, and each bracket 60 is adapted to engage the lower ends of the tripping bars 58, extending downwardly from the wedges, 51, whereby when the brackets are raised, the wedges are raised through the medium of said bars. The forked arms 62 of the yoke are adapted to be raised by means of peripheral cams 64 on the main shaft 24, and are provided with laterally directed antifriction rollers 65, that rest and roll on the periphery of said cams 64. The cams 64 are so disposed with respect to each other, that they act to lift the tripping bars 58, simultaneously and thereby simultaneously raise the wedges 51 and withdraw the plunger rods 45, and this movement occurs at the time when the carrier is advancing, just after the nuts have been subjected to the cracking operation. When the antifriction rollers 65 of the yokes 61 pass off of the highest part of cams 64, wedges 51 are forced to drop by gravity and the extent of their drop depends upon the lengths of the nuts held between the plungers. Fig. 2, illustrates the wedges 51 in their downward positions, with four lengths of nuts between the plungers and the wedges assume four different vertical planes. The wedges are adapted for operation through the vertical slots 66, formed in the inner edges of the cross heads 53, and a plurality of detachable bars 67 are secured to the cross heads by screws 68 and spaced apart to allow the body portion of the wedge members 51 to travel therebetween.

A locking means for the wedges 51, during the cracking operation is provided and consists of the bars 69 mounted on the adjustable bolts 70 in the face of the cross heads 53, and which are connected by cross members 71, the said bolts pass through the slots 72 of the bars and permit the cross members, and the bars to slide on the tops of the heads. The outer edges of the cross members are knurled as at 67 and adapted, simultaneously with the cracking operation, to engage the knurled edges 59 of the wedges, serving to grip the same and hold each wedge in position and against further downward movement by gravity.

The ends of the bars 69 are provided with threaded shanks 73 and have arranged thereon springs 74 and nuts and washers, 75 and 76, and when properly regulated by adjusting nut 75, the locking device moves inwardly arresting all of the holding wedges, thus preventing slipping and thus establishing co-operation with certain rocking levers 77, to force the entire set of wedges and plungers inwardly together to crush the nuts.

Figure 6:
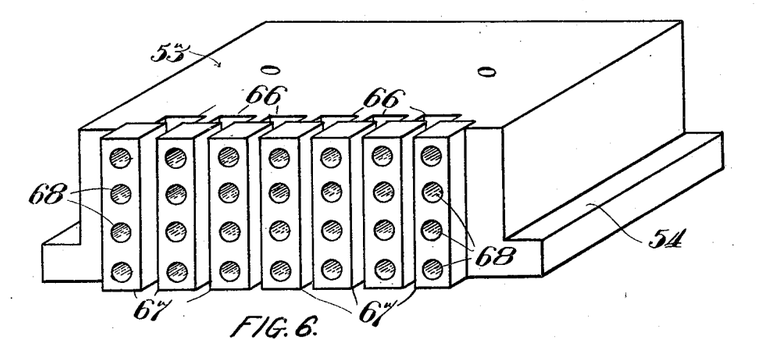
Figure 6, is a perspective view of a cross head, also shown in Figs. 2, 3, 4, 17, 18, and 19.
Figures 7, 8, 9, 10, 11, 12, 13, 14, 15, 16:
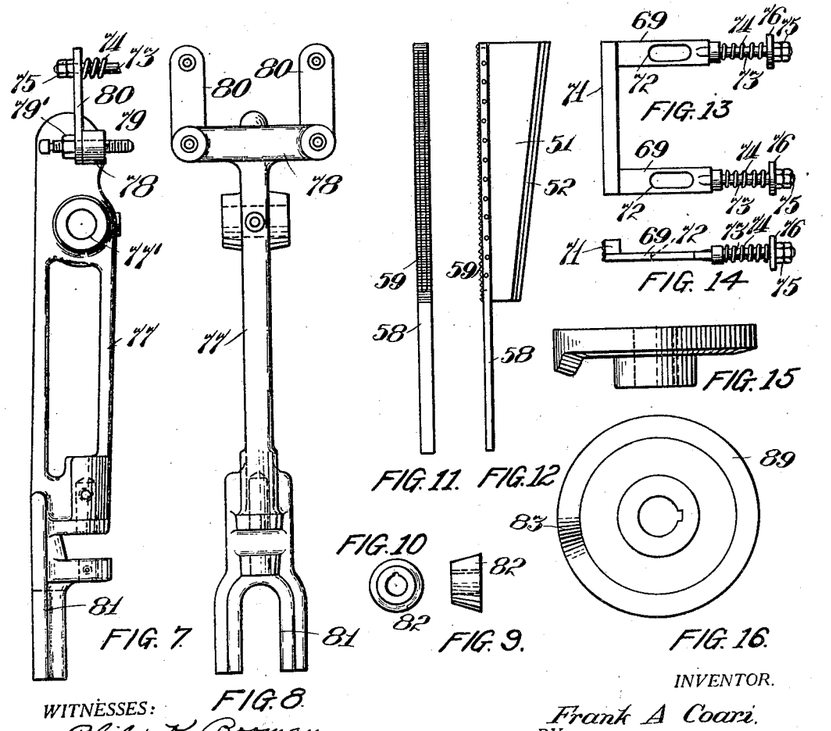
Figure 7, is a side view of one of the reciprocatory levers.
Figure 8, is a front elevation of the reciprocatory lever; shown in Fig. 7.
Figure 9, represents a side view of cam roller carried by said levers.
Figure 10, represents a front view of the cam roller shown in Fig. 9.
Figure 11, represents a side view of one of the sliding wedges.
Figure 12, represents a front elevation of the sliding wedge shown in Fig. 11.
Figure 13, represents a plan view of a locking strip.
Figure 14, represents an end view of the locking strip shown in Fig. 13.
Figure 15, represents a side view of one of the face cams.
Figure 16, represents a front view of the face cam shown in Fig. 15.
Figure 17:
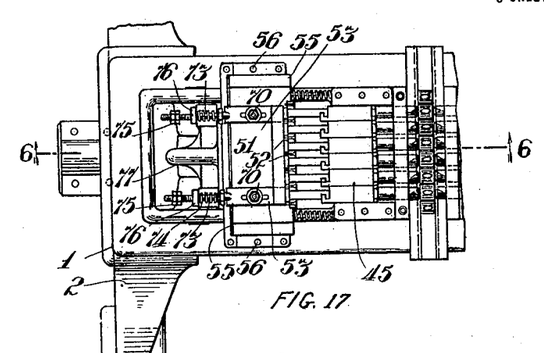
Figure 17, is a partial plan view of the machine.
Figure 18:
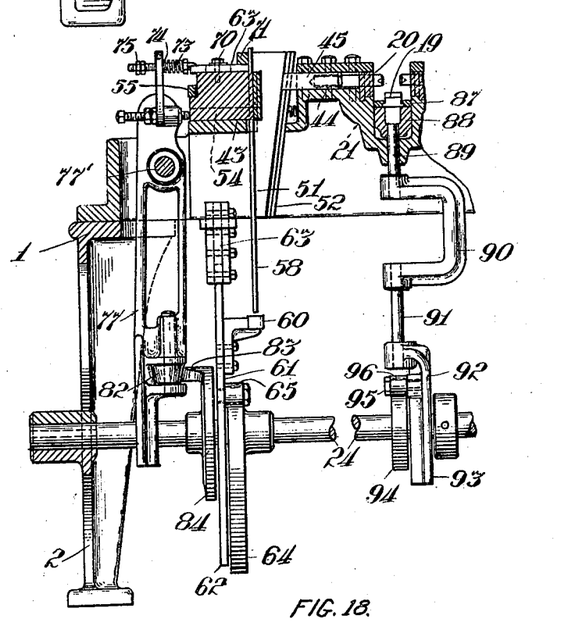
Figure 18, is a vertical section taken on line 6—6 (Fig. 17).
Figure 19:
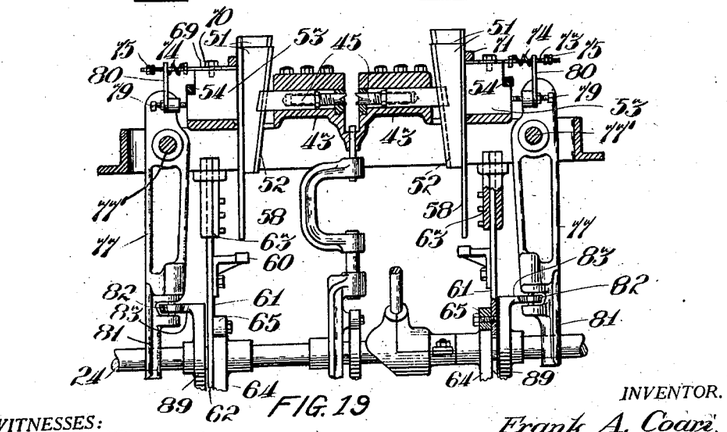
Figure 19, is a partial vertical section taken longitudinally on the center line of the machine.

When the nuts have been advanced to a position in register with the several plungers, the latter are forced inwardly by pressure applied to the wedges 51, to advance them a sufficient distance to crack or disrupt the shells and such action is accomplished in the following manner. The cross heads 53, illustrated in Figs. 6, 18, and 19, slide toward and from each other in horizontal guides provided in the bed frame of the machine and during the forward sliding movement, transmit through the plungers the pressure to crack the nuts; both cross heads being actuated inwardly simultaneously. The cross heads 53, are moved inwardly by means of vertically disposed reciprocatory levers 77, which are pivoted near their upper ends to the bed frame of the machine on the pivot shafts 77'. The levers 77 are provided at their ends with cross bars 78, having set screws 79 at its opposite ends and extending therethrough, which latter bear against the outer faces of the cross heads 53. Links 80 are carried by the set screws 79 and are apertured at their ends for the shanks 73 of outer ends of locking bars 69. The lower ends of the reciprocatory levers 77, are forked and said forks 81 straddle the main shaft 24, while cam rollers 82 are mounted in the said levers 77, immediately above the forked portion and are adapted for engagement with the laterally direct cam projections 83, on the lateral face of cam 84 mounted on the shaft 24. Upon each revolution of the cams 84, the lower ends of the reciprocatory levers 77 are forced outwardly, the upper ends of the levers being forced inwardly and exerting pressure to a degree on the ends of the locking bars 69, to insure the advancing of the cross heads 53 and wedges 51 toward the plungers.

The plungers and cross heads are returned to retracted position after the cam rollers 82 have passed off the cam projections 83 by springs 74, on the shanks 73, of the slotted bars 69, being disposed between the links 80 of the levers 77 and the washers 76, and they co-operate with springs 57, and serve to force the cross heads 53 outwardly against the stop bars 55. By adjusting the set screws 79 of the cross bar 78, inwardly or outwardly, movement of the cross heads is regulated. The cross heads 53 are always in engagement with the upper ends of the levers 77, and if the set screws 79, through the nuts 79' are adjusted, to permit a longer retractive movement of the cross heads, the forward movement of the cross heads and the travel of the wedges and plungers will be correspondingly regulated. Likewise the length of the cracking strokes of the plungers will be regulated, resulting in regulating the extent of the cracking or crushing action on the shells of the nuts.

An important feature embodied in my improved machine consists of dropping or depressing the part of the upper lap of the conveyor 19, which delivers the nuts to the cracking mechanism, just after the nuts have been centered by the plungers, thereby preventing the ends of the plungers engaging the conveyor 19, with the result of distorting the links and interfering with the operation of the machine. The mechanism for safeguarding the conveyor 19, is constructed and operated in the following manner: The upper lap of the chain is partially supported and guided in its track through the central bed frame opening and between the sprocket wheels 85 and 86 mounted on the frame casing, by a longitudinally extending plate 87, more clearly illustrated in Fig. 18. The plate 87, extends transversely through the central opening in the bed frame casing and is secured to the upper end of a reciprocatory cross head 88 by any suitable means, as has been before stated, the walls of the said central opening are parallel and the cross head 88, fits snugly therein and is operable in a vertical plane. The cross head 88 is raised or lowered to effect the drop of the conveyor 19, by means of a rod 89, vertically operable in a restricted opening communicating with the said central opening and is attached to an offset member 90, substantially crank shaped and through which goes the lower lap of the carrier 19. The offset member is in turn attached to a rod 91, and rod 91 is connected at its lower end to the upper end of a yoke member 92, the arms 93 of which pass at the sides of, and have guiding engagement with the hub of a cam disk 94, mounted on the main shaft 24. The yoke member 92, are provided with laterally extending pins 95, on which are mounted antifriction rollers 96, adapted for engagement with the peripheral surface of the cam disk 94. The peripheral edge of the cam disk 94 is concentric except for a depression 97 and the elements are so regulated, that the antifriction roller 96 drops into said depression, after the plungers have centered the nuts and before the cracking operation begins. The antifriction roller 96 rides on the concentric edge of the cam disk 94 and holds the upper lap of the carrier 19 in its uppermost position.

By this improved construction it will be noted, the longitudinal plate 87, has overlapping sliding engagement with the side margin of the links 22 of the conveyor 19, (see Fig. 18) which are curved upwardly at their ends. When the cross head 88, is depressed it will not only permit the conveyor to fall by gravity, but the interlocking flanges positively draw this part of the conveyor downwardly, so there can be no possibility of the engagement of the crushing plungers with the conveyor, and the movement of said conveyor and the impeding mechanism is therefore positive.

Figures 20, 21, 22:
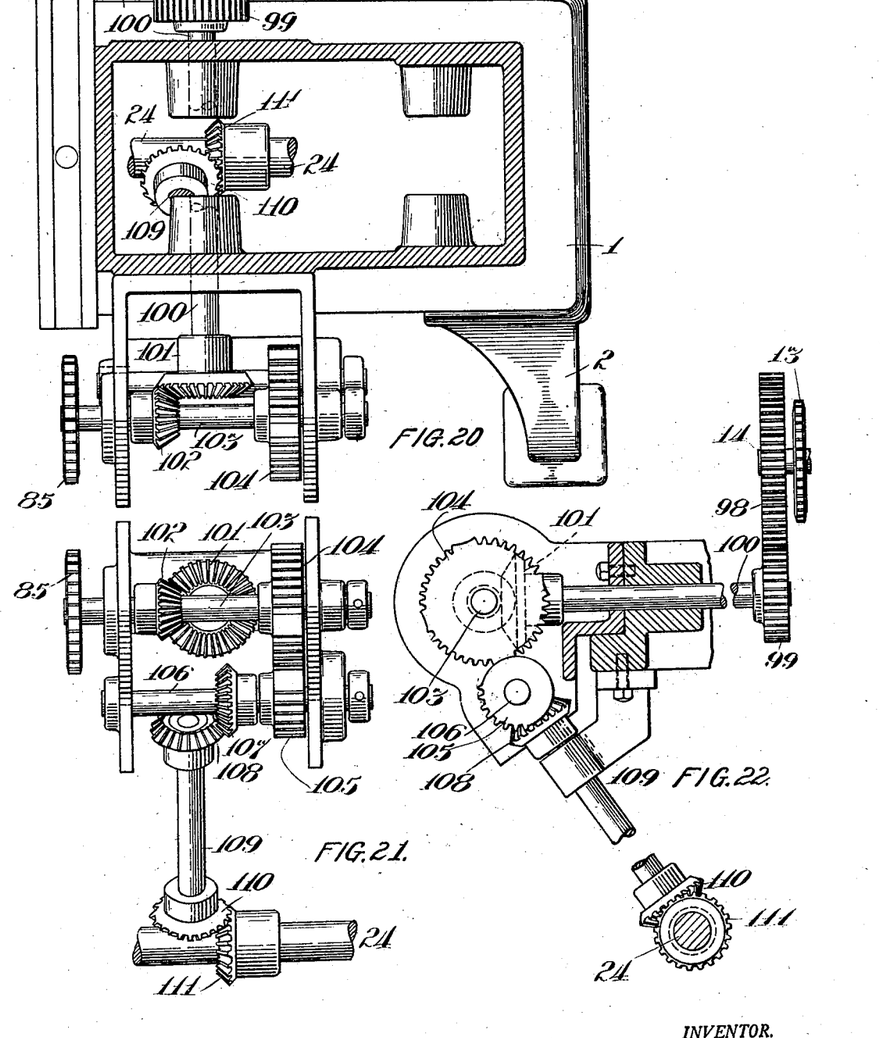
Figure 20, is a partial plan and partial cross sectional view showing the gearing of the intermittent mechanism.
Figure 21, is a front elevation of the gearing shown in Fig. 20.
Figure 22, is a partial end and partial sectional view of the gearing shown in Fig. 20.
Figure 23:
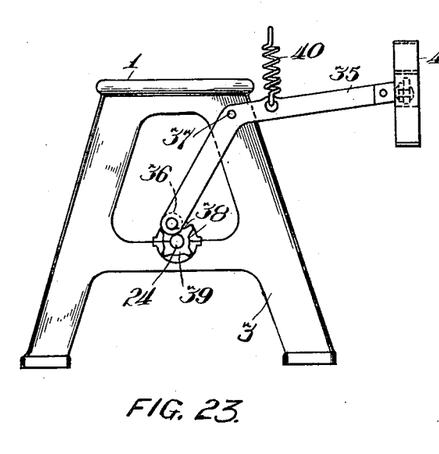
Figure 23, is a detail view of the hopper shaking element attached to one of the standards and the operating mechanism, therefor.
Figure 24:
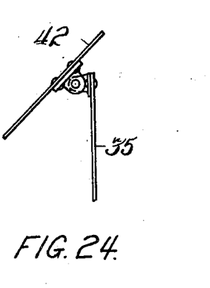
Figure 24, is an end view of the shaking element.
Figure 25:
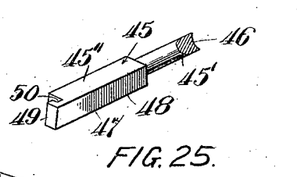
Figure 25, is a perspective view of one of the plungers detached from its associated and operative parts.

The various feeding, ejecting and crushing elements are given intermittent movement through the medium of mechanism, which is timed with respect to the other parts of the machine and, in this connection, it is readily seen that the endless feeding belt 7, is given an intermittent movement through the opening provided therefor in the hopper 4, through the medium of sprocket wheels 13, on shaft 14, over which the feeding belt 7 is trained. Likewise mounted on shaft 14, is a gear 98, (Fig. 22) which meshes with a gear 99 mounted on a shaft 100, and a gear 101 is keyed to the opposite end of this shaft and meshes with a bevel pinion 102, (Fig. 21), fixedly mounted on a shaft 103. One end of a shaft 103 carries the sprocket 85, by which the conveyor 19, is operated and a timing gear 104, is fixedly mounted adjacent the other end of said shaft and is driven by the timing pinion 105, securely fastened on shaft 106. Shaft 106 is driven through a bevel gear 107, mounted thereon and which meshes with the bevel pinion 108, mounted on the upper end of the upright shaft 109. Motion is transmitted to gear 107, and bevel pinion 108, by another bevel gear 110, disposed on the lower end of shaft 109, and gear 110, in turn is in meshing engagement with a beveled gear 111, which latter is mounted on the main drive shaft 24.

The main shaft is continuously rotatable and it will thus be seen, that as the sprockets 13 on shaft 14 and sprockets 85 on shaft 103, are actuated, intermittent movement imparted to the feeding belt 7, through sprocket 13, is imparted to conveyor 19, through sprocket 85. The endless carrier or conveyor 19, which receives the nuts from the feeding belt 7, and which delivers the nuts to the plungers, has imparted thereto, an intermittent forward advance movement. The length of such intermittent movement is equal to that of six of the transverse pockets of the conveyor 19.

Shafts 14, 100, 101, 109, 106, and 24 are suitably mounted in bearings on the machine frame standards and the housing 21, and the main shaft 24 has fixidly mounted thereon a gear 112, which receives motion through the medium of a pinion 113, on a rotative counter shaft 114, mounted in the lower part of the standards.

A counter shaft 115, is rotatively mounted in the lower part of the standards and carries at one end the usual tight and loose pulleys 116, and 117, and the driving connection between counter shafts 114 and 115 consists of a gear 118, on counter shaft 115 and a pinion 119, on counter shaft 114, a belt operating on pulley 117, transmitting motion to the machine. The extent of motion imparted to the endless feeding belt will be sufficient to discharge a group of nuts into the conveyor 19, at each intermittent movement and the mechanism is so regulated that upon the positioning of a series of nuts in front of the plungers, the same will be ejected into the conveyor pockets, then centered by the plungers and wedges and finally crushed. When the wedges are in operative position, the plungers are forced out and engage the nuts to center same and during this pause, the reciprocatory levers 77 are rocked, thereby forcing the cross heads 53 to travel inwardly to engage the wedges, which in turn force the plunger 70 against the ends of the nuts with requisite force to crush same. The tension of said breaking force may be regulated by adjusting springs 74 on the bars 69.

While I have shown and herein described an operative structure embodying my invention and one which is an improved form, it is to be understood that the details of construction may be widely varied without departing from the spirit of the invention, and I do not wish to be limited to such details, except as hereinafter made the subject of specific claims.

I claim:

1. In a nut cracking machine, the combination with a carrier, of two groups of cracking plungers at each side of the carrier to directly deliver the same, a hopper for the nuts, a carrier co-operating with the first named carrier and arranged at right angles thereto and means for automatically ejecting the nuts from one carrier to the other.

2. In a nut cracking machine, the combination with a carrier, of two groups of cracking plungers at each side of said carrier, a carrier co-operating with the first named carrier and extending at right angles thereto, a hopper, means for delivering the nuts from the hopper to its associated carrier, and means for directly delivering the nuts to the first named carrier.

3. In a nut cracking machine, the combination with a carrier, of two groups of cracking plungers at each side of said carrier, a hopper for the nuts, a carrier operable in said hopper and extending at right angles to said first named carrier, means for agitating the nuts in said hopper, to cause same to be deposited endwise in the last named carrier, and means for ejecting the nuts from the hopper carrier to directly deliver the same to the first mentioned carrier.

4. In a nut cracking machine, the combination with a carrier for the nuts, of two opposed groups of cracking plungers, one group at each side of the carrier, a hopper for the nuts, a carrier operable in said hopper and extending at right angles to said first named carrier for directly delivering the nuts to the latter, means for conveying a number of nuts from the hopper to its associated carrier and means for ejecting the nuts from one carrier to the other and positioning same for the cracking operation of the plungers.

5. In a nut cracking machine, the combination with a transverse carrier for the nuts, of two opposed groups of cracking plungers, one group at each side of the carrier, a hopper for the nuts, a longitudinal carrier associated with the hopper, means for depositing nuts endwise in the last named carrier, means for ejecting the nuts from one carrier for direct delivery to the other, means for centering the nuts on the transverse carrier and means acting through the medium of the centering means for transmitting pressure to the plungers to force them toward each other in their cracking positions.

6. In a nut cracking machine, the combination with a transverse carrier for the nuts, of two opposed groups of cracking plungers one group on each side of the carrier, a hopper, a longitudinal carrier associated with said hopper, means having engagement with the hopper carrier for agitating the nuts, means for intermittently operating said carriers and means for ejecting the nuts from the hopper carrier to directly deliver the same to the transverse carrier.

7. In a nut cracking machine, the combination with an intermittently movable carrier, of two opposed groups of plungers one at each side of the carrier, a hopper, a carrier associated with said hopper and having pockets, means for delivering the nuts from the hopper to the carrier, means for depositing a certain number of nuts endwise in said carrier pockets and means for ejecting the nuts from said pockets to directly deliver the nuts to the first named carrier.

8. In a nut cracking machine, the combination with an intermittently movable carrier, a hopper for the nuts, a carrier associated with said hopper and provided with pockets, of two opposed groups of cracking plungers one at each side of the first named carrier, means for delivering nuts endwise from the hopper to the second carrier, means for directly delivering nuts from the carrier pockets to the first named carrier, means for preliminarily moving the plungers together to center the nuts on the carrier and means for forcing the plungers into their cracking position.

9. In a nut cracking machine, the combination with an intermittently operable carrier, a hopper for holding the nuts, an endless carrier associated with said hopper provided with pockets, crushing plungers disposed at each side of the first carrier, means for agitating the upper lap of said endless carrier to cause a predetermined number of nuts to be delivered endwise into the carrier pockets, intermittent means for ejecting the nuts from the carrier pockets to be directly delivered on to the first named carrier, means acting on the outer ends of the plungers for centering the nuts on the first named carrier and means acting through the medium of the centering means, for transmitting pressure to the plungers to force them toward each other in their cracking positions.

10. In a nut cracking machine, the combination with an intermittently operable carrier, a hopper for holding the nuts, a carrier operable in said hopper, said hopper carrier comprising tranverse bars formed with pockets, cracking plungers disposed at each side of the first named carrier, means for depositing a predetermined number of nuts endwise in the carrier pockets, means operable in the pockets for ejecting the nuts and delivering same to the other carrier for submission to the action of the cracking plungers.

11. In a nut cracking machine, the combination with a transversely operable carrier, of cracking plungers disposed at each side of said carrier, a hopper for the nuts, a carrier associated with said hopper, said carrier comprising transversely extending bars having pockets therein, mechanism for intermittently depositing a predetermined number of nuts endwise into said pockets, means for directly delivering the nuts from the pockets to the transverse carrier, means for preliminarily operating the plungers to center the nuts on the transverse carrier and for intermittently operating the plungers to simultaneously force the same into their cracking positions.

12. In a nut cracking machine, the combination with a transverse movable carrier, of cracking plungers disposed at each side of said carrier, a hopper, a carrier operable in the hopper, said carrier comprising a plurality of bars having openings for the reception of nuts from the hopper, mechanism for actuating the plungers in their crushing operation therein, an element for ejecting the nuts from the hopper carrier to deliver the same directly to said transverse carrier, and means for actuating the plungers to center the nuts on the transverse carrier.

13. In a nut cracking machine, the combination with an intermittently movable transverse carrier, of two groups of opposed horizontally reciprocating cracking plungers, blocks one on each side of the carrier in which the plungers are independently slidable, vertically slidable wedges having inclined faces adapted for engagement with the plungers, whereby when the wedges are raised the plungers slide outwardly and when depressed the plungers slide inwardly, a hopper for the nuts, a longitudinal carrier associated with said hopper and having a plurality of transverse bars provided with openings, means for depositing a number of nuts endwise in the openings of the carrier and an element for ejecting nuts from the hopper carrier to deliver the same directly to said transverse carrier.

14. In a nut cracking machine, the combination with a transverse intermittently movable carrier, of two groups of opposed horizontally reciprocating cracking plungers, guide blocks one on each side of the carrier in which the plungers are independently slidable, vertically slidable, wedges having inclined faces adapted for engagement with the plungers, a hopper for the nuts, a longitudinal carrier associated with said hopper, said carrier comprising a plurality of transversely extending bars having pockets therein, means for intermittently agitating the hopper carrier to dispose a number of nuts endwise in the said pockets, means for intermittently ejecting the nuts from the pockets to deliver the same directly on to the transverse carrier and means for actuating the transverse carrier to depress same during a cracking operation.

15. In a nut cracking machine, the combination with a transverse carrier, of intermittently movable cracking plungers, one group on each side of the carrier, a hopper for the nuts, a drive shaft, a longitudinal carrier disposed in the bottom of said hopper, an agitating element for said carrier operable through the drive shaft, an element for ejecting the nuts from the hopper carrier to be delivered directly to the transverse carrier, a rotative cam attached to said drive shaft and engaging said ejecting element and means for actuating the plungers to move same into their cracking position.

16. In a nut cracking machine, the combination with a carrier, of two groups of cracking plungers, one on each side of the carrier, the plungers of each group being horizontally and independently movable toward and from the other plungers, independently movable wedges individual to and acting on said plungers to force the same inwardly, means for retracting the plungers as the wedges are retracted, and means for simultaneously and yieldingly locking the wedges in advance during the cracking operation.

17. In a nut cracking machine, the combination with a carrier, of two groups of cracking plungers, one on each side of the carrier, the plungers of each group being horizontally and independently movable toward and from the other plungers, independently gravity acting wedges for forcing the independently movable plungers inwardly, means for yieldingly locking said wedges against vertical movement in advance of the cracking operation, and means for retracting the plungers as the wedges are retracted.

18. In a nut cracking machine, the combination with a carrier, of two groups of cracking plungers, one on each side of the carrier, the plungers of each group being horizontally and independently movable toward and from the other plungers, lever means for actuating wedges, and means associated with said lever means for simultaneously and yieldingly locking the wedges in functional position in advance of the cracking operation.

In testimony whereof I affix my signature.

FRANK A. COARI.